United States Patent Office 2,893,816
Patented July 7, 1959

2,893,816

POLYACRYLONITRILES DYED WITH QUATERNIZED HETEROCYCLIC AZO DYES

Sien Moo Tsang, Middlesex, Charles E. Lewis, Somerville, and Albert P. Paul, New Brunswick, N.J., assignors to American Cyanamid Company, New York, N.Y., a corporation of Maine No Drawing. Application March 1, 1957
Serial No. 643,231

19 Claims. (Cl. 8—55)

This invention relates to colored polyacrylonitrile fibers, to dyes for use in preparing such fibers, and to new intermediates for the preparation of such dyes. More specifically, it relates to polyacrylonitrile fibers containing a major proportion of acrylonitrile dyed with quaternary ammonium azo dyes which have the formula:

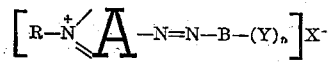

in which A is the remainder of an aromatic ring system in which all rings between the quaternized nitrogen and the azo bridge which are not fused to the heterocyclic ring are linked in a continuous conjugation, in which aromatic ring system the quaternized nitrogen is an integral part of a heterocyclic ring to which not more than one other ring is fused in the case where the said heterocyclic ring is fused to any other ring of said aromatic ring system and through which aromatic ring system the quaternized nitrogen is conjugated with the azo group, R is an organic radical, B is a carbocyclic aromatic radical of less than three rings, Y is an unionized substituent whose bond to an aromatic ring has a dipole moment greater than 1.00 Debye unit with the negative end of said dipole at the ring, such substituents being conjugated with the azo bridge, n is a positive integer less than 3 and X⁻ is an anion. More specifically also, it relates to azopyridinium and 2-(phenylazo)benzothiazolium dyes. More specifically also, it relates to a process of condensing 2-aminopyridines with para-nitrosodimethylaniline which comprises heating said compounds in a non-polar solvent in the presence of potassium hydroxide and azeotropically distilling off the water formed. More specifically also, it relates to a new class of N₁-aryl-N₂-pyridyl hydrazine substituted in the aryl group by electron donating substituents in conjugation with the hydrazine bridge.

The polyacrylonitrile fibers, which have become increasingly useful articles of commerce, are difficult to dye. Most of the commercially available fibers of this type contain a major porportion of polyacrylonitrile. In most cases over 85% of the fiber is acrylonitrile. Few of the standard dyestuffs available show affinity for these high-acrylonitrile-content-fibers. Especially, it has been hard to obtain deep shades on these fibers, since deep shades require a strong affinity of the fiber for the dyestuff. The only way to achieve deep shades has been to increase the time and temperature of the dyeing process. Such drastic conditions of dyeing result in injury to the fabrics. The resistant properties of these fibers are desirable for general textile use because they render the fiber physically durable. However, the problem of dyeing has been so great that these durable types may have to be superseded by more dyeable types which are less durable physically unless methods of dyeing them readily are found. In some fibers there has been incorporated a basic comonomer for the main purpose of making them dyeable with acid dyes.

The dyes which have been on the market for acrylic fibers not containing basic comonomers are not azo dyes but primarily are dyes of the styryl or polymethine or anthraquinone class. In general, in the past it has not been believed possible for azo dyes to have good fastness properties on acrylic fibers of this type, and it is most surprising to find a class of dyes which does have such fastness. It is further surprising that the azo dyes have sufficient light fastness to be of value, since azo dyes in general have poor light fastness unless converted into metallic complexes. It is further surprising that amino azo dyes should have pH stability, since such dyes are known to undergo a shade change with pH.

We have found that azo derivatives of quaternized heterocyclic ring systems having an electron donating or releasing group in conjugation through the azo group with the quaternized nitrogen have an exceptional affinity for acrylic fibers, especially those containing no basic comonomers. The affinity of these dyes is so strong that very heavy shades may be obtained ranging from yellow to red, bordeaux, maroon, red-brown, brown, violet and blue shades. At the same time, we have found that these dyes can be used to give very pleasing light shades and that the shades obtained from these dyes have excellent light fastness with little or no sensitivity to change of pH. We have also found that dyes of this class having for the quaternized heterocyclic ring system a pyridine or its homologs and benzo derivatives or a 2-arylbenzothiazole in which the azo group is on the 2 position of the aryl ring are new dyes of exceptional properties. We have further found two unusual synthetic processes for the synthesis of intermediates for these compounds and new intermediate hydrazines of value.

These dyes used generally in our invention have the general formula:

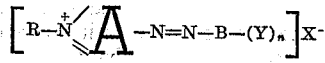

in which A may be any one of a number of heterocyclic ring systems, R is a quaternizing group, B is an aryl carbocyclic radical of less than three rings, Y is the electron donating group, and X⁻ is the anion. The detailed equivalents of each of these symbols are discussed below, but in general the electron donating group Y must be in conjugation through B with the azo group and through A with the quaternary nitrogen.

The polyacrylonitriles which fall within the scope of our invention are those polymers and copolymers of acrylonitrile which contain a major proportion by weight of acrylonitrile. They may also contain basic comonomers, such as methylvinylpyridine and vinyl pyridine, or comonomers such as methyl acrylate, vinyl acetate and vinyl chloride. Of the polyacrylonitriles available commercially which can be used to form the colored polyacrylonitriles of our invention, one is 100% polyacrylonitrile, another is approximately 95% acrylonitrile and approximately 5% methyl acrylate, another has 89% of acrylonitrile, 6% methylvinylpyridine, and 5% vinylacetate, and still another has a composition of 94% acrylonitrile, 5% methylvinylpyridine, and 1% vinyl acetate. Polymers having as little as 50% acrylonitrile can be dyed by this class of dyes to form our invention. However, those lacking the basic comonomer not only present a more serious problem in dyeability when using previously available dyes but also, and surprisingly, are dyed better and stronger by these cationic dyes.

The dyestuffs to be used in our invention are represented by the above formula. A is the remainder of an aromatic ring system in which the quaternized nitrogen is an integral part of a heterocyclic ring. This heterocyclic ring may stand alone or may be fused to not more than one additional ring. In either case the heterocyclic ring or it plus the rings fused to it can be separated from the azo bridge by further aromatic rings and unsaturated bridges, the whole representing unbroken conjugation between the quaternary nitrogen and the azo bridge. Such ring systems include the various azoles such as benzothiazoles, thiazoles, benzoxazoles, oxazoles, benzimidazoles, imidazoles, pyridines; the benzopyridines such as the quinolines; various diazines such as pyridazines, pyrimidines, pyrazines; and others such as pyrazoline, 2-arylaryleneazoles (e.g. 2-phenylbenzothiazole), 2- and 4-pyridylbenzenes and quinolylbenzenes, pyridylazobenzenes, benzothiazolylazobenzenes, pyridylphenylazonaphthalenes, aryleneazolylazobenzenes, pseudoindole, and the like. In any of these rings the azo bridge must be attached to the aromatic ring system in such a way that it is in conjugation with the quaternized nitrogen, that is, that it is separated from the quaternized nitrogen by an odd number of unsaturated atoms. When the ring system A includes more than one aryl group not directly fused to the quaternized heterocyclic ring, such aryl groups must be linked into a continuous conjugated chain between the azo bridge and the quaternized nitrogen. Thus, A can be e.g., a pyridylbenzene (direct diaryl bonding) or a pyridylazobenzene (linking through a second azo bridge). Other examples of such complex aromatic systems represented by A are listed above.

The aryl group on the other side of the azo bridge, for which the symbol B is used in the general formula, is a carbocyclic aromatic radical of less than three rings, such as the benzene, biphenyl or naphthalene ring systems. The substituent Y on this aryl group B is an electron releasing group. It must be substituted on B in such a way that it too is in conjugation with the azo group, that is, Y is separated from the carbon to which the azo bridge is linked by an odd number of carbon atoms. Electron releasing substituents in an aromatic ring are those having a dipole whose negative end is toward the ring. It is necessary that this substituent be of this nature in order to get adequate substantivity.

However, this electron releasing property must be carefully controlled since the net charge on the azo dye must remain positive. The electron releasing mechanism must be such that it will not diminish too much the charge on the quaternized nitrogen. As a result the group Y may not be an ionized substituent. Consequently, such forms as phenolic salts may not be present as Y. Especially is this true of the phenolic salts, since when such are present in the same molecule as the quaternized nitrogen, there is a tendency for the zwitterion to mesomerize into a neutral molecule with a quinoid structure and such a mesomeric form is deficient in many properties when applied to polyacrylonitrile fibers. Hydroxyl can be present but must be applied only from an acid bath. Similarly, the electron releasing power must not be too small else the substantivity of the dyestuff is reduced, since the electron releasing power is connected with the dipole of the bond joining the group to the aromatic group. Consequently Y cannot be a phenolic salt or a substituent with a low dipole such as alkyl or one with a reverse dipole such as a halogen. It is preferable to state the electron releasing power in terms of this dipole. The dipoles of some of the common substituents of this nature are as follows:

—N(CH$_3$)$_2$ _____ 1.58
—NH$_2$ _____ 1.52
—OH _____ 1.61
—OCOCH$_3$ _____ 1.52
—OCH$_3$ _____ 1.16
—CH$_3$ _____ 0.41
—H _____ 0

The operable substituent Y includes those in this column and their homologues and similar derivatives except for the alkyl and the unsubstituted aryl at the bottom of the list. Consequently, it is necessary in order to define the operable groups to specify that they should be an unionized substituent whose bond to the ring has a dipole moment greater than 1.00 Debye units with the negative end of said dipole at the ring.

The quaternizing group R may be any organic radical. R may be an alkyl such as methyl, ethyl, propyl, butyl, lauryl, cetyl, octadecyl, and the like. It may be an alkenyl group such as allyl or crotyl, or an aralkyl such as benzyl or substituted benzyl or it may be a cycloalkyl group such as cyclohexyl and the like.

The anion X$^-$ may be any suitable anion of an acid, such as the bromide, iodide, chloride, sulfate, phosphate, nitrate, acetate, methosulfate, ethosulfate, and the like. In general, the anions of the strong mineral acids such as the halides, the sulfates, the nitrates and the phosphates, or the anions of organic sulfonic acids such as the benzenesulfonate and the like are preferred but the anions of organic acids such as the organic carboxylic acids will be equally well usable.

In the general dyestuffs usable in our invention, groups A and B may be further substituted but the substituents must be so chosen that the net charge on the dye molecule remains positive. Substituents such as alkyl, nitro, alkoxy and halogeno groups are usually suitable. Examples of such dyestuffs containing substituents elsewhere in the molecule are as follows:

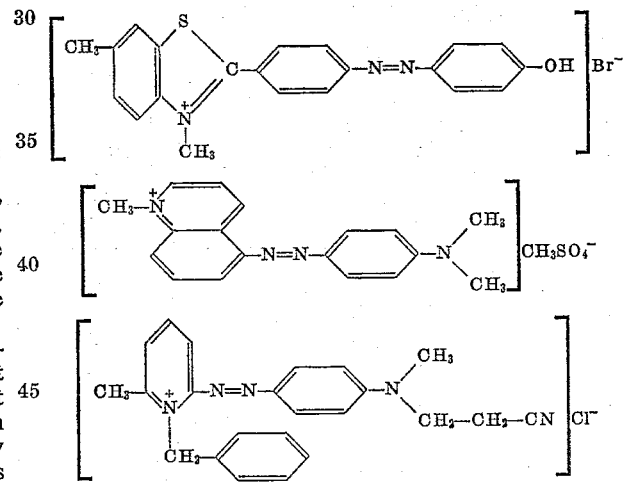

In some cases the azo group is attached directly to the ring having the quaternized nitrogen. In other cases it is in another ring or separated by an arylene group. However, in all cases it must be in a position conjugated with the quaternized nitrogen.

Our invention also includes certain new dyes of the types described above. One which is especially to be preferred includes the dyes in which A is the residue of a pyridine, substituted pyridine or benzopyridine, defined collectively as a monazine; that is an aromatic ring system of one or two rings having one six membered heterocyclic aromatic ring comprising five carbons and one nitrogen. Of these an especially preferred species are the cationic pyridinium dyes of the formula:

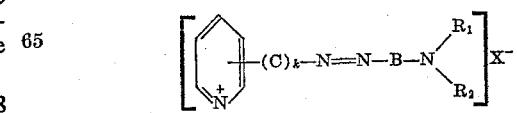

where the group C is attached to the pyridinium nucleus in the 2 or 4 position (that is, in conjugation with the quaternary nitrogen), $k$ is 0 or 1 (i.e. the azo bridge is either bonded directly to the pyridine ring or through C), C is an azophenylene group in which the azo group is conjugated through the phenylene with the azo bridge in the formula, B is an arylene radical of the benzene or naphthalene series, the amino nitrogen being attached to a position conjugated with the azo group, as described above (that is, ortho or para in the same ring and where the group B is, e.g., naphthalene, also in the 5 or 7 positions in the other ring), R is an alkyl, substituted alkyl, cycloalkyl, aryl, aralkyl or alkenyl group as described above, and X is the anion of an acid such as the iodide, bromide, chloride, methosulfate, ethosulfate, or phosphate as described above, $R_1$ and $R_2$ may be hydrogen, alkyl groups such as methyl, ethyl, lauryl, cetyl, or octadecyl, acyl such as acetyl and benzoyl, alkenyl such as allyl and butenyl, or substituted alkyl such as cyanoethyl and cyclic alkyl such as cyclohexyl or $R_1$ and $R_2$ together with the nitrogen may be part of a heterocyclic ring such as a morpholine, piperidine, pyrrolidine, pyrrolidone, and the like. The dye molecule may be further substituted provided the net charge of the dye molecule remains positive. The azo group must be in the 2 or 4 position obviously in order to be conjugated with the quaternary nitrogen. If the azo group is in a meta position (i.e., 3 or 5) of the pyridine nucleus (a definite loss in affinity for acrylic fibers and poor light fastness is obtained.

The 2-arylazo pyridinium dyes generally demonstrate the greater pH stability of shade. Dyes such as

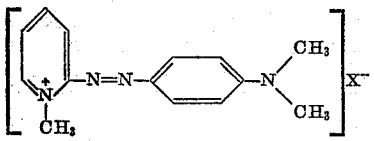

or its 6-methyl pyridinium analog, or analogous higher alkyl analogs or substituted alkyl analogs such as beta-cyanoethyl, especially when such substituents are on the amino group, are dyes of exceptional affinity, fastness to light, and resistance to changes of shade with pH. The anion $X^-$ is not critical, but may be any halide, sulfate, phosphate, etc. However, the 4-azo type in which the azo bridge is para to the quaternized nitrogen in the pyridinium ring also have very strong affinity for acrylic fibers and in some cases are just as stable to pH. For example, the dyestuff

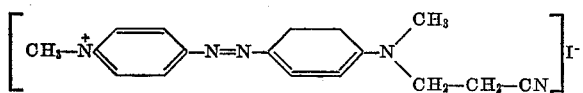

is a bright bordeaux quite stable to change in pH.

While these pyridinium dyes have been described in terms of pyridine and its homologs and substituted form, the new dyestuffs of our invention encompass also the benzopyridines such as the quinolines and, thus, in its broader aspects, our new dyes comprise azo dyes of this type derived from any such quaternized monazine.

Our invention also comprises the various 2-arylazolium dyes in which the azo bridge is attached to the 2-aryl group in a position in which it is conjugated with the quaternized azole nitrogen. Such dyes have the formula:

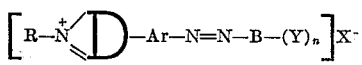

in which D is the residue of an azole ring system such as thiazole, oxazole, imidazole, benzothiazole, benzoxazole, benzimidazole, and the like in which the quaternized nitrogen is the nitrogen of the azole ring, Ar is a carbocyclic ring system of less than three rings such as phenylene or naphthylene linked to the azole ring in the 2-position and to the azo bridge such that the latter is conjugated with the quaternized nitrogen, and B, Y, R and X have the definitions given previously.

METHODS OF PREPARATION

The dyestuffs to be used in our invention can be prepared by a number of various methods, some of which are more applicable to some dyes than to others. In the following discussion of these various preparations, the schematic formulae use the same general symbols as are used for the general formula of dyestuff above.

1. Coupling followed by quaternization

The diazo derivative of a heterocyclic amine can be coupled with the proper coupling agent and the resulting azo dye quaternized as illustrated by the following schematic formula:

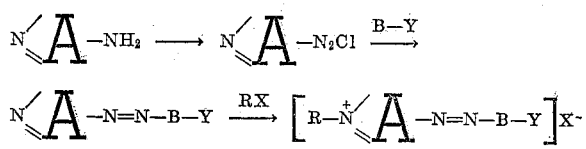

(Conversely, the diazotizable heterocyclic amine can be first quaternized and then diazotized and coupled.) Suitable starting materials for the formation of azo dyes by this method of preparation are the following amines, as diazo components:

4-aminopyridine
4-amino-2- or 3-methylpyridine
4-amino-2,6-dichloropyridine
4-(p-aminophenyl)-pyridine
2-(p-aminophenyl)-pyridine
2-(4-amino-1-naphthyl)-pyridine
2-, 4-, 5-, or 7-aminoquinoline
5-amino-6,7-dimethoxyquinoline
4-amino-2,3-dimethylquinoline
4-amino-2-ethoxyquinoline
5-amino-6-methylquinoline
4-amino-7-chloroquinoline
7-amino-2-phenylquinoline
4-amino-2-methylquinoline
2-(p-aminophenyl)-quinoline
8-aminoisoquinoline
2-(p-aminophenyl)-6-methylbenzothiazole
2-amino-5-methylthiazole
2-aminobenzothiazole
1-methyl-2-(p-aminophenyl)-benzimidazole
1-methyl-2-(p-aminophenyl)-5-chlorobenzimidazole These may be coupled to Aniline
N,N-dimethylaniline
3-methyl-N,N-dimethylaniline
3-ethoxy-N,N-diethylaniline
2,6-diethylaniline
N-methyl-N-β-cyanoethylaniline
N,N-bis(β-cyanoethyl)aniline
3-methoxy-N-methyl-N-β-cyanoethylaniline
N,N-diethylaniline
α or β-naphthylamine
N-methyldiphenylamine
N-methyl-α-naphthylamine
2,5-dimethoxyaniline
N,N-bis-(β-hydroxyethyl)aniline
2,4-diaminotoluene
2-methylimidazopyridine
2-methylpyrrocoline
2-phenylpyrrocoline
1-methyl-2-phenylindole
1,2,4-trimethyl-3-carbethoxypyrrole
2,4-diamino-6-hydroxypyrimidine

2. Condensation of an amine with a nitroso compound

Another method of preparation of the dyestuffs to be used in our invention, which is especially useful for the 2-azopyridinium dyestuffs of our invention, is the condensation of a 2- or 4-aminopyridine with a nitroso compound followed by quaternization of the resultant azo dye. This preparation can be illustrated by the following equation using 2-aminopyridine and paranitroso dimethylaniline as the illustrative reactants.

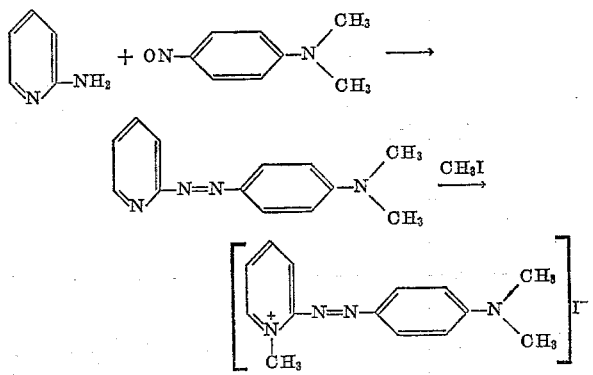

Some amines which can be used in this method of preparation are:

2- or 4-aminopyridine
2-amino-3-, 4-, 5-, or 6-methylpyridine
4-amino-2- or 3-methylpyridine
2- or 4-amino-3-ethyl-6-methylpyridine
2-amino-4-ethylpyridine
4-amino-2-ethylpyridine
2-amino-5-chloropyridine
2-amino-3,5-dichloropyridine
2-amino-5-ethoxypyridine
2- or 4-aminoquinoline
2-amino-8-ethoxyquinoline
2-amino-4,5,6,7 or 8-methylquinoline
1-aminoisoquinoline
1-amino-3-methylisoquinoline These amines can be condensed with any one of the following:

4-nitroso-N,N-dimethylaniline
4-nitroso-3-methyl-N,N-dimethylaniline
4-nitroso-3-ethoxy-N,N-diethylaniline
4-nitroso-N,N-diethylaniline
4-nitroso-N-methyl-N-β-cyanoethylaniline
4-nitroso-3-methoxy-N-methyl-N-β-cyanoethylaniline
3-nitroso-2-methylimidazopyridine
3-nitroso-2-methylpyrrocoline
3-nitroso-1-methyl-2-phenylindole
4-nitroso-N-methyl-N-phenylaniline This method is especially important because such compounds as 2-aminopyridine cannot be diazotized and coupled. Consequently, this or another alternative preparation to be described later must be used.

An improvement in this process is moreover a part of our invention. The condensation of 2-aminopyridine with a nitroso compound has previously been carried out by forming a metal salt either by the use of a reagent such as sodium metal or with such agents as sodium methylate, sodium ethylate or sodamide. Because of the weakly acidic character of 2-aminopyridine, it was not believed possible that an alkali metal hydroxide would be a sufficiently strong base to convert sufficient quantities of 2-aminopyridine to the metallic salt to make further condensation practical. Indeed it is reported in the literature that this reaction would not go with powdered sodium hydroxide.

We have found, however, that when the reaction is carried out in an inert non-polar solvent with potassium hydroxide ranging in quantities from catalytic amounts to an excess, and the water is azeotropically distilled from the mixture as formed, one can get a surprisingly good yield of the corresponding azo body from the condensation of a 2-aminopyridine with a nitroso compound. The distillation of the water helps to complete the reaction and to increase the yield. It is preferred that an equimolecular amount of 2-aminopyridine and potassium hydroxide and a 30% excess of the nitroso compound be used. An excess of potassium hydroxide appears to increase formation of the symmetrical azoxy by-product derived from the self-condensation of the nitroso compound. Although this azoxy compound is readily separated in weakly acidic aqueous media in which the new dyes of this invention have good solubility, the formation of this by-product decreases the yield. The reaction proceeds with catalytic amounts of potassium hydroxide as low as 3–6% of the theoretical amount, but is slower than when an approximately equimolecular proportion is used. It is preferable to use a non-polar solvent such as xylene, toluene, benzene and the like and to maintain anaerobic conditions by covering the reaction mixture with an inert atmosphere such as nitrogen. Polar solvents result in low yields or even no yields at all. The anaerobic conditions are preferred because of the sensitivity of the potassium salt of 2-aminopyridine.

This improved process has a number of advantages over the process of the prior art. Potassium hydroxide is less expensive, easier to store and handle and less hazardous than the reagents such as metallic sodium, sodamide, sodium methylate and the like, and in addition the reaction does not require special apparatus. Furthermore, potassium hydroxide does not react with non-polar solvents as do such reagents as metallic sodium, thus permitting a wider range of solvents to be used.

This method of preparing the azo compounds of our invention is used as an alternative where diazotization and coupling are not readily effected. When diazotization and coupling are possible, that preparation is to be preferred.

3. *Condensation of a halopyridine with a substituted phenylhydrazine*

Another alternative preparation for those azo compounds not readily derivable by a diazotization and coupling procedure, is to condense a halo compound with an aryl hydrazine properly substituted, and to oxidize the resulting diaryl hydrazine to the azo body. This procedure can be illustrated by the following equation using 2-bromopyridine and para-nitro-phenylhydrazine as the reactants.

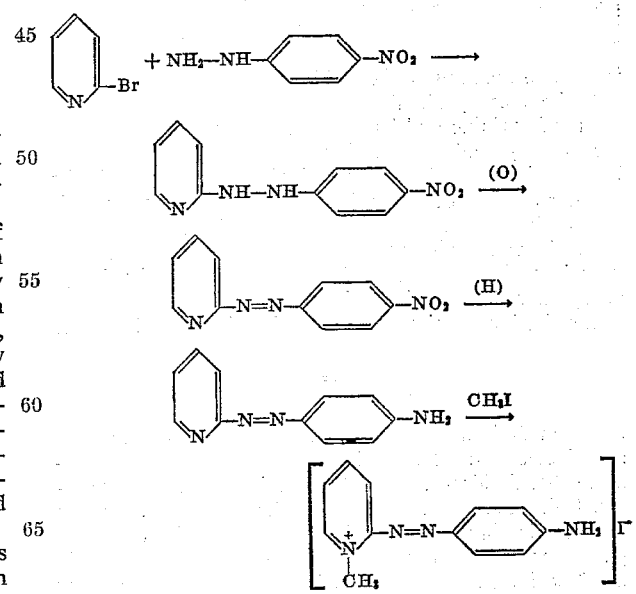

Reactions such as the first step have been carried out in the past in an ethanolic solution at high pressures and temperatures. This reaction is carried out using an excess of the 2-halopyridine at moderate temperatures without the need of pressure equipment.

The substituted pyridyl aryl hydrazines which are the intermediates in this process form a further aspect of our invention. They may be represented by the formula:

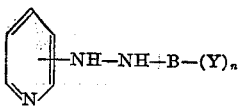

in which B is a carbocyclic aromatic group of less than three six-membered rings, Y is either as defined above or a group capable of being transformed into such a group, such as nitro, and n is a positive integer less than three, and the pyridyl nitrogen is conjugated with the nearest hydrazine nitrogen. Examples of such compounds are $N_1$-4-nitrophenyl-$N_2$-2-pyridyl hydrazine, $N_1$-2,4-dinitrophenyl-$N_2$-2-pyridyl hydrazine, $N_1$-4-methoxyphenyl-$N_2$-2-pyridyl hydrazine, $N_1$-4-acetamino-1-naphthyl-$N_2$-2-pyridyl hydrazine, $N_1$-4-nitrophenyl-$N_2$-4-pyridyl hydrazine, $N_1$-2,4-dinitrophenyl-$N_2$-4-pyridyl hydrazine, $N_1$-4-methoxyphenyl-$N_2$-4-pyridyl hydrazine, $N_1$-4'-acetoxy-4-biphenyl-$N_2$-2-pyridyl hydrazine and the like. Such compounds, new to the art, are not only useful in preparing the new dyes of our invention but as intermediates for antioxidants, intermedaites for pyrazoldiones and for other products.

It is an advantage of our invention that polyacrylonitrile fibers can be dyed with a wide range of shades which show a remarkable stability over a very wide range of pH from basic to strongly acid. The shades obtained differ markedly from those available for polyacrylonitriles. The dyed fibers show superior fastness to light, carbonizing, dry and wet pressing and washing, as well as to alkaline perspiration. It is a further advantage of our invention that the dyestuffs are readily soluble in water, and dye polyacrylonitrile fibers well at 200° F. in 1% shades with good exhaust. It is a still further advantage of our invention that when dyed from neutral, acetic acid or sodium acetate baths the same dye gives the same shade; unless the phenolic hydroxyl is present, in which case the alkaline bath must be avoided. Furthermore, the dyed fibers of our invention show good strength and levelness.

Our invention can be further illustrated by the following examples in which parts are by weight unless otherwise specified.

EXAMPLE 1

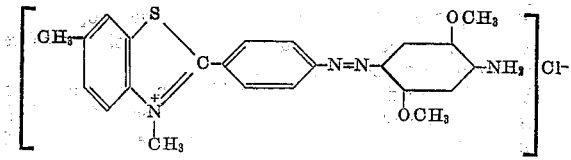

27.8 parts of 2-(p'-aminophenyl)-3,6-dimethylbenzothiazolium chloride is dissolved in 500 parts of water containing 10.9 parts of hydrochloric acid and cooled externally to 5° C. Seven parts sodium nitrite dissolved in 70 parts water are added and the mixture is stirred 10 minutes until diazotization is complete.

Sixteen parts of 2,5-dimethoxyaniline is dissolved in 1000 parts water containing 4 parts hydrochloric acid and iced to 10° C. The diazo solution is added and the solution is adjusted to a negative test on Congo red indicator paper with aqueous 20% sodium acetate solution. The dyestuff precipitates and is filtered. The wet press cake is dissolved in 500 parts of water by heating. It is cooled and sufficient sodium chloride is added to precipitate the crystalline dyestuff, which is filtered, washed with brine and dried.

The quaternary ammonium azo dyestuff thus obtained, when dyed by method A or B of Example 9, dyes polyacrylonitrile fibers comprising 94% acrylonitrile and 6% methyl acrylate a full red-brown shade.

EXAMPLE 2

If in Example 1, other coupling components are used in place of 2,5-dimethoxyaniline as shown in Table 1, new dyes for acrylic fibers are obtained. These, when dyed on the same polyacrylonitrile fibers from neutral dye baths, give shades as follows:

| Coupling component used: | Shade |
|---|---|
| Phenol | Yellow. |
| Dimethylaniline | Red. |
| Di(β-hydroxyethyl)aniline | Brown. |
| 1-naphthylamine | Red-violet. |

EXAMPLE 3

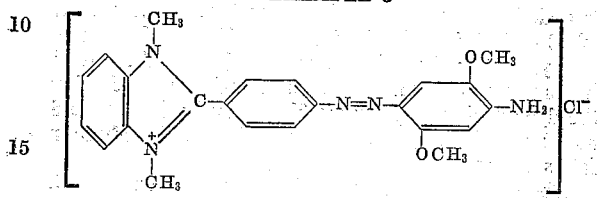

If in Example 1, the 27.8 parts of the diazo component are replaced by 27.3 parts of 2-p-aminophenyl-1,3-dimethylbenzimidazolium chloride and the coupling procedure followed, a cationic azo dye is obtained which dyes polyacrylonitrile fibers by the dyeing procedures A, B, and D of Example 9, a bright orange shade of good fastness to alkaline perspiration.

EXAMPLE 4

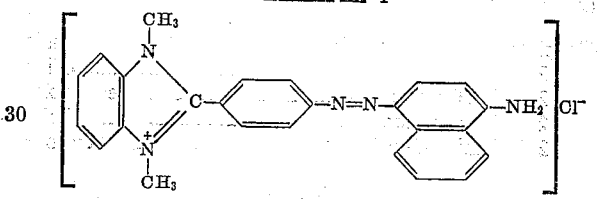

If in Example 3, the 2,5-dimethoxyaniline is replaced by an equivalent amount of 1-naphthylamine, a quaternary ammonium azo dye is obtained which dyes the polyacrylonitrile fibers a reddish orange from neutral baths, which shade has good fastness to alkaline perspiration.

EXAMPLE 5

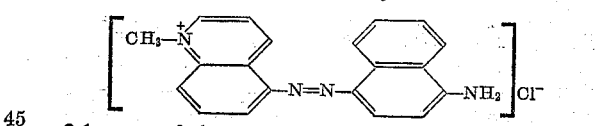

2.1 parts of the methiodide of 5-nitroquinoline is dissolved in 50 parts of water and added to freshly precipitated silver chloride in 10 parts by volume of 20% hydrochloric acid solution. After clarification, the solution is reduced in the presence of 0.4 part of palladium catalyst and hydrogen. After clarification, the filtrate containing the 1-methyl-5-aminoquinolinium chloride is cooled to 2° C. and diazotized with 3.8 parts by volume of 1 N sodium nitrite solution.

A solution of 0.72 part 1-naphthylamine in a mixture of 50 parts water and 4 parts by volume of 5 N hydrochloric acid solution is neutralized to Congo red indicator paper by the addition of 20% sodium acetate solution. The solution of diazo is then added and the coupling mixture adjusted by the addition of sodium acetate to a weakly acid solution negative to Congo red indicator paper. The dye is isolated by filtration and washed with water. It is then slurried in 150 parts water at 80° C., made acid to Congo red indicator paper. The solution of the dye is then salted to precipitate the dyestuff which is isolated by filtration and dried.

When dyed on polyacrylonitrile fibers comprising 94% polyacrylonitrile and 6% methyl acrylate from neutral bath, a violet shade fast to light is obtained.

EXAMPLE 6

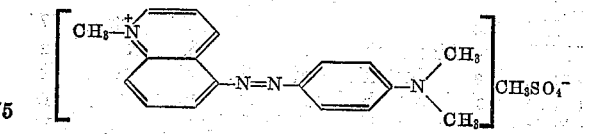

27.0 parts of 1-methyl-5-aminoquinolinium methyl sulfate are dissolved in 200 parts of water containing 19.6 parts of sulfuric acid and cooled to —2° C. 6.9 parts sodium nitrite dissolved in 100 parts of water is added at once and stirred until diazotization is complete.

9.4 parts dimethylaniline are dissolved in 100 parts water containing 10 parts of sulfuric acid. The diazo solution is added and then 20% sodium acetate solution is added to remove the mineral acidity. A temperature of 10–15° C. is maintained by the addition of ice as necessary. After the mixture is stirred until the coupling is complete, 180 parts of sodium sulfate are added and the dye which precipitates is filtered and dried. The dye may be purified by recrystallizing from 5% sodium sulfate solution.

When dyed by method A, B, C, or D of Example 9, a deep maroon shade is obtained on polyacrylonitrile fibers containing 96% acrylonitrile and 6% methyl acrylate.

EXAMPLE 7

If in Example 6, the iodide is used instead of the methyl sulfate of the diazo component and other coupling components are substituted for dimethylaniline, new quaternary ammonium azo dyes for acrylic fibers are obtained as follows:

| Coupling component used: | Shade |
|---|---|
| Phenol | Olive |
| 2,5-dimethoxyaniline | Deep violet |
| 2,4-diaminotoluene | Violet |
| 2,4-diamino-6-hydroxypyrimidine | Orange |

EXAMPLE 8

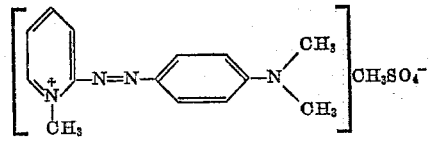

To 50 parts by volume of xylene and 3.2 parts of finely ground 87% potassium hydroxide in an atmosphere of nitrogen, or other suitable inert anaerobic conditions, is added 4.7 parts of 2-aminopyridine in 50 parts by volume of hot xylene. The mixture is heated at reflux and all water formed during the reaction is azeotropically distilled off. Then 10 parts of p-nitrosodimethylaniline in 100 parts by volume of hot xylene is added gradually at reflux. Refluxing is continued until the condensation is complete. The reaction mixture is allowed to cool sufficiently to clarify by filtration. The xylene filtrate is then extracted with 5% hydrochloric acid, which is made up to 450 parts by volume. About 50 parts by volume of 20% sodium hydroxide solution is then added with stirring until the extract has become weakly acid. The by-product, p,p'-bisdimethylamino-azoxybenzene, is removed by filtration. The filtrate containing the desired product is then adjusted by means of 20% sodium hydroxide solution to a pH of approximately 8 to precipitate the product. After stirring about ½ hour, the product is isolated by filtration, washed with water and dried.

The dye is then quaternized by dissolving in 250 parts by volume of dry toluene, adding 3.0 parts by volume of dimethyl sulfate and refluxing about four hours. The cationic pyridinium dye which precipitates during this time is isolated by filtration, washed with toluene and dried.

When dyed on acrylic fibers using the methods of Example 9, violet shades of good fastness to light, crocking, and perspiration are obtained.

If in the above process, instead of 3.2 parts of 87% KOH, quantities such as 1.9 parts, 0.85 part or 6 parts are used, a product identical to the violet dye described above is similarly obtained when dyed on polyacrylonitrile fibers such as fibers of the following compositions:

| No. | Acrylonitrile | Methylacrylate | Vinylacetate | Methylvinylpyridine | Vinylpyridine |
|---|---|---|---|---|---|
| 1 | 100 | | | | |
| 2 | 96 | 4 | | | |
| 3 | 95 | 5 | | | |
| 4 | 94 | 6 | | | |
| 5 | 94 | | 1 | 5 | |
| 6 | 89 | | 5 | | 6 |

EXAMPLE 9

Dyeing of polyacrylonitrile 0.2% dye on weight of fiber is dissolved in water and diluted to 200 parts. The pH is adjusted as indicated in A, B, C, and D below. Five grams acrylic fibers having a major proportion of acrylonitrile are added. The dye bath is brought to boil in 10–20 minutes and boiling is continued one hour. The fiber is rinsed with cold water and then soaped with 0.1% neutral soap solution, rinsed and dried.

A. 2% acetic acid, 0.3% sodium acetate.
B. Neutral; no additives.
C. 1% sulfuric acid.
D. 1% soda ash.

All percents are on the weight of the fiber or fabric.

When the product of Example 11 is dyed by methods A, B or C above, a deep violet is obtained on fiber 2 of Example 8.

EXAMPLE 10

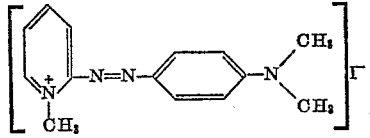

3.4 parts of the azo condensation product of Example 8, 20 parts by volume of methyl alcohol and 0.95 part by volume of methyl iodide are charged in a sealed container and heated at 75° C. until reaction is complete. The product, recrystallized from boiling methyl alcohol and washed with ether, is similar to the methosulfate product of Example 8 in shade and dyeing properties.

A similar product is obtained under conditions of reflux instead of pressure:

A similar product is obtained if 40 parts of azo condensation product prepared as in Example 8, and 10 parts by volume of methyl iodide dissolved in 100 parts by volume of dry benzene are refluxed seven hours.

When dyed on fiber 2 of Example 8 a deep violet shade is obtained with a standard light fastness rating of 5–6.

EXAMPLE 11

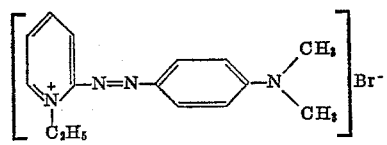

One part of the condensation product of Example 8, 25 parts by volume of benzene and 4 parts of ethyl bromide are refluxed until quaternization is complete. The precipitated quaternary dye is filtered off and washed with ether. When dyed on fiber 2 of Example 9, it is slightly redder than the quaternized dyestuff of Example 8.

EXAMPLE 12

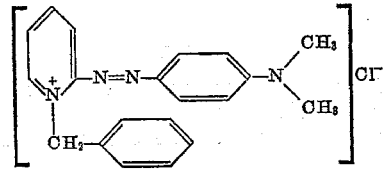

One part of the condensation product of Example 8, 25 parts by volume of benzene and 0.8 part of benzyl chloride are refluxed until the reaction is complete. The quaternized product is filtered, washed with ether and dried. It is a bluer violet than the quaternized dye of Example 8.

EXAMPLE 13

If in Example 8 or Example 10, in place of 4-nitroso-N,N-dimethylaniline, other nitroso components are used which have electron releasing groups in the ortho or para position, dyes are obtained which have high affinity for polyacrylonitrile fibers when dyed one hour at the boil in neutral to weakly acid dye baths.

| Nitroso Components | Shade | |
|---|---|---|
| | Fiber 2 of Ex. 9 | Fiber 6 of Ex. 9 |
| p-nitrosoanisole | Yellow | Yellow. |
| 4-nitroso-3-methyl-N,N-dimethylaniline | Violet | Violet. |
| 4-nitroso-3-ethoxy-N,N-diethylaniline | Gray-violet | |

EXAMPLE 14

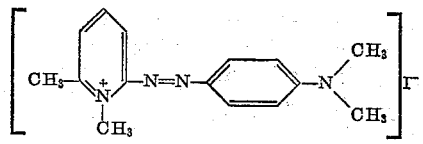

If a condensation of 2-amino-α-picoline is made with nitrosodimethylaniline following the methods of Example 8 and the product is quaternized by the method of Example 10, with methyl iodide, an excellent deep red-violet shade fast to perspiration and light is obtained on fiber 2 of Example 9.

If instead of 2-amino-α-picoline, the 5-methyl-2-aminopyridine is used, the resultant quaternary ammonium due, 1,5 - dimethyl-2-(p-dimethylaminophenylazo)pyridinium iodide, is a much bluer violet.

EXAMPLE 15

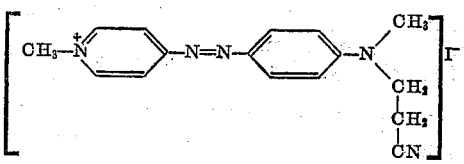

35 parts of finely ground sodium nitrite are added to 1,000 parts of 98% sulfuric acid at 20–45° C. The solution is cooled to 5° C. and 50 parts of 4-aminopyridine dissolved in 250 parts of glacial acetic acid are added gradually with external cooling to hold the temperature below 15° C. The diazo mixture is stirred a short time.

80 parts of N-methyl,N-β-cyanoethylaniline are dissolved in 200 parts of glacial acetic acid and added to the diazo at 15–20° C. The reaction mixture is stirred until the reaction is complete, drowned in a large volume of ice and made up to 5,000 parts by volume. The pH is adjusted to 7-8 with 20% sodium hydroxide solution. The dyestuff which precipitates is filtered off and dried.

The azo dyestuff thus obtained is quaternized as follows: The dye is dissolved in 1,500 parts by volume of benzene. The inorganic salts are removed by filtration. To the filtrate are added 100 parts of methyl iodide and the mixture refluxed until quaternization is complete. The desired azo pyridinium product is then separated by filtering the hot solution and dried.

It dyes polyacrylonitrile fibers a bright bordeaux when methods A or B of Example 9 are used. The dyeing has excellent light fastness and wash fastness.

EXAMPLE 16

Other quaternized 4-(arylazo)-pyridinium dyes similar to those of Example 15 may be made in a manner similar to Example 15, using the same diazo component but varying the coupling component. When dyed in neutral to very weakly acid bath one hour at the boil, the following results are obtained.

| Coupling component: | Shade |
|---|---|
| 2,6-diethylaniline | Deep red |
| 2-naphthylamine | Bordeaux |
| N,N-dicyanoethylaniline | Blue-red |
| 3-ethoxy-N,N-diethylaniline | Violet |
| N,N-dimethylaniline | Bright Violet |
| 3-methyl-N,N-dimethylaniline | Violet |
| N,N-dipropylaniline | Violet |
| 2,5-dimethoxyaniline | Bordeaux |
| 2,5-dimethyl-N,N-diethylaniline | Violet |
| 2,6-diamino-pyridine | Scarlet |

EXAMPLE 17

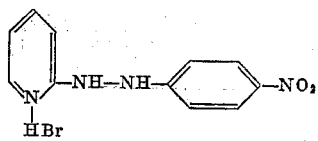

A mixture of 20 parts of para-nitrophenyl-hydrazine and 63.2 parts by volume of 2-bromopyridine is heated gently until the mixture is homogeneous. The mixture is then heated to the boiling point of 2-bromopyridine for a few minutes, after which it is cooled. The precipitated product is filtered and dried, giving a good yield of 2-para-nitrophenylhydrazinylpyridine hydrobromide.

Instead of para-nitrophenylhydrazine, equivalent parts of the following compounds can be used to give the corresponding hydrazinyl derivatives suitable as intermediates for preparing the dyes of this invention:

2,4-dinitrophenylhydrazine
4-methoxyphenylhydrazine
4-acetamino-1-napthylhydrazine
p-(N-phenyl-N-methyl)aminophenylhydrazine
p-(N-phenyl)aminophenylhydrazine
p-(N-p'-methoxyphenyl)aminophenylhydrazine Also in the above procedure other 2- or 4-halogenopyridines or p-tolylhydrazine may be used in place of 2-bromopyridine to give new intermediates.

EXAMPLE 18

The hydrohalides of Example 17 may be converted to the corresponding free bases by the following method:

10.05 parts of 2-p-nitrophenylhydrazinylpyridine hydrobromide are suspended in 200 parts of water and treated with a solution of 3.19 parts of sodium bicarbonate in 50 parts of water. The reaction mixture is stirred until neutralization is complete and is then filtered to give the free base.

EXAMPLE 19

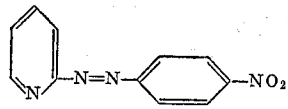

To a stirred suspension of 24.62 parts of 2-p-nitrophenylhydrazinylpyridine hydrobromide in 300 parts by volume of glacial acetic acid heated at gentle reflux is added gradually a solution of 62.4 parts by volume of 1 N sodium nitrite in 40 parts of water. The reaction mixture is cooled, diluted with 1000 parts of water and made alkaline by the addition of sodium carbonate. Filtration isolates brown crystals of the product.

EXAMPLE 20

To a stirring and refluxing solution of 6.30 parts of 2-p-nitrophenylhydrazinylpyridine in 50 parts by volume of glacial acetic acid is added gradually a solution of 18.0 parts by volume of 1 N sodium nitrite in 12 parts of water. The reaction mixture is heated at reflux until the reaction is complete; about half of the acetic acid is removed by steam distillation and the resulting mixture diluted with 500 parts of water. Neutralization at 10–15° C. with concentrated ammonium hydroxide isolates brown crystals of the product.

EXAMPLE 21

A mixture of 1.42 parts of 2-p-nitrophenylhydrazinyl-pyridine hydrobromide and 21 parts by volume of 30% sodium hydroxide solution is heated at the boil for 45 minutes while a stream of air is blown through the mixture. On cooling, the mixture is filtered to give brown crystals.

Other hydrazines prepared as shown in Example 17 may be oxidized by the methods of Examples 19, 20 or 21 to form azo compounds, the nitro group of which may be reduced to an amino group and quaternized by the method of Example 22 to give new cationic dyes which dye polyacrylonitrile fibers red to blue shades.

EXAMPLE 22

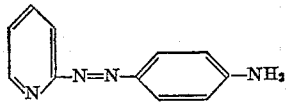

To a refluxing solution of 0.5 part of 2-p-nitrophenyl-azopyridine in 9.5 parts by volume of ethanol is added a solution of 1.17 parts of sodium sulfide nonahydrate in 8.77 parts of water. The resulting solution is heated at reflux until the reaction is complete. It is then cooled and filtered to give the product as bright orange crystals.

This dye when quaternized by methods described in Examples 8, 10, 11 or 12 gives a cationic dyestuff which dyes polyacrylonitrile fibers bright red shades with excellent fastness properties.

EXAMPLE 23

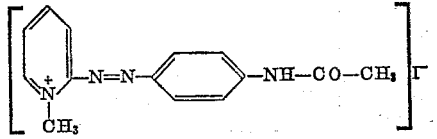

A mixture of 0.3 part of 2-p-aminophenylazo-1-methyl-pyridinium iodide and 10 parts of acetic anhydride is refluxed until the reaction is complete. It is then cooled, filtered and washed with benzene to give the product as red crystals.

It dyes polyacrylonitrile fibers a bright yellowish orange shade.

If, instead of acetic anhydride, an equivalent amount of p-nitrobenzoyl chloride is used, a cationic dyestuff is obtained which dyes polyacrylonitrile fibers a bright yellowish-orange which is slightly yellower than the corresponding acetyl dye.

EXAMPLE 24

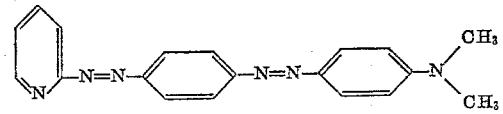

0.51 part of 2-p-aminophenylazopyridine is dissolved in 30 parts of water containing 0.27 part of hydrochloric acid and cooled to 0–5° C. 0.24 part of sodium nitrite dissolved in 3 parts of water is added and the mixture is stirred until diazotization is complete.

0.31 part of dimethylaniline is dispersed in 30 parts of water containing 1.3 parts of trisodium phosphate and iced to 15° C. The diazo solution is added and the resulting mixture stirred without temperature control until coupling is complete. The precipitated product is isolated by filtration and purified by recrystallization from cyclohexane.

EXAMPLE 25

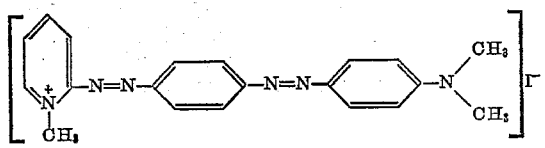

A stirred solution of 0.39 part of the product of Example 24 and 5 parts of methyl iodide in 20 parts of benzene is heated at gentle reflux until quaternization is complete. The precipitated dyestuff is filtered from the cooled reaction mixture and purified by recrystallization from absolute alcohol. This dyestuff dyes polyacrylonitrile fibers deep blue with excellent fastness properties.

We claim:

1. Polyacrylonitrile containing at least 50% of acrylonitrile, colored by compounds which have the structure:

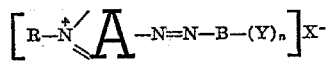

in which A is the remainder of an aromatic ring system, in which aromatic ring system the quaternary nitrogen is an integral part of a heterocyclic ring to which not more than one other ring is fused in the case where the said heterocyclic ring is fused to any other ring of said aromatic ring system, in which all rings between the quaternized nitrogen and the azo bridge which are not fused to the heterocyclic ring are linked in a continuous chain of conjugation, and through which aromatic ring system the said quaternary nitrogen is conjugated with the azo group, R is a non-aromatic organic radical, B is a carbocyclic aromatic radical of less than three rings, Y is an unionized substituent whose bond to an aromatic ring has a dipole moment greater than 1.00 Debye units with the negative end of said dipole at the ring, said substituents being conjugated with the azo bridge, $n$ is a positive integer less than 3 and $X^-$ is an anion.

2. The polyacrylonitrile of claim 1 in which the proportion of acrylonitrile is over 85%.

3. The polyacrylonitriles of claim 2 in which there are no basic comonomers.

4. The polyacrylonitriles of claim 3 which are in fiber form.

5. Polyacrylonitrile containing at least 50% of acrylonitrile, dyed with compounds of the structure:

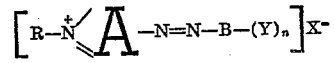

in which A is an aromatic ring system in which the quaternary nitrogen is part of a monazine ring system of less than three rings and in which all rings not part of the said monazine ring system which separate said monazine system from the azo bridge are linked in a continuous chain of conjugation and through which aromatic ring system the said quarternary nitrogen is conjugated with the azo bridge, R is a non-aromatic organic radical, B is a carbocyclic aromatic radical of less than three rings, Y is an unionized substituent whose bond to an aromatic ring has a dipole moment greater than 1.00 Debye units with the negative end of said dipole at the ring, said substituents being conjugated with the azo bridge, $n$ is a positive integer less than 3, and $X^-$ is an anion.

6. Polyacrylonitrile of claim 5 in which the dye has the formula:

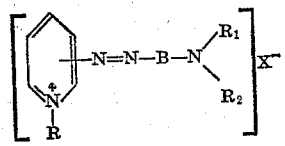

in which the azo bridge is attached to the pyridinium nucleus in a position separated from the quaternary nitrogen by an odd number of carbon atoms, B is a carbocyclic aryl radical of less than three rings, the amine nitrogen being conjugated through B with the azo bridge, R is an organic radical, X⁻ is a non-aromatic anion, $R_1$ and $R_2$ are selected from the group consisting of hydrogen, alkyl, substituted alkyl, cycloalkyl, acyl, and heterocyclic rings in which $R_1$ and $R_2$ are joined and in which the amine nitrogen is a part, and the substituents $R_1$ and $R_2$ together with any nuclear substituents on B are chosen so that the net charge of the dye structure remains positive.

7. Polyacrylonitrile fibers containing at least 50% of acrylonitrile dyed with 1-methyl-2-(p-dimethylaminophenylazo)-pyridinium salt.

8. Polyacrylonitrile fibers containing at least 50% of acrylonitrile dyed with 1-methyl-2-(p-aminophenylazo)-pyridinium salts.

9. Polyacrylonitrile fibers containing at least 50% of acrylonitrile dyed with 1-methyl-4-(N-methyl-N-β-cyanoethyl-4-aminophenylazo)-pyridinium salts.

10. Polyacrylonitrile fibers containing at least 50% of acrylonitrile dyed with 1-methyl-4-(N,N-bis-β-cyanoethyl-4-aminophenylazo)-pyridinium salts.

11. Polyacrylonitrile fibers containing at least 50% of acrylonitrile dyed with 1-methyl-2-(p-nitrobenzoylaminophenylazo)-pyridinium salts.

12. Polyacrylonitrile fibers containing at least 50% of acrylonitrile dyed with 1-methyl-4-(2-amino-α-naphthylazo)-pyridinium salts.

13. Polyacrylonitrile fibers containing at least 50% of acrylonitrile dyed with 1-methyl-2-(p-benzoylaminophenylazo)-pyridinium salts.

14. Polyacrylonitrile fibers containing at least 50% of acrylonitrile dyed with 1,6-dimethyl-2-(p-dimethylaminophenylazo)-pyridinium salts.

15. Polyacrylonitrile fibers containing at least 50% of acrylonitrile dyed with 1-methyl-2-[p-(p-N,N-dimethylaminophenylazo)phenylazo]-pyridinium salts.

16. Polyacrylonitrile fibers containing at least 50% of acrylonitrile, dyed with compounds of the structure:

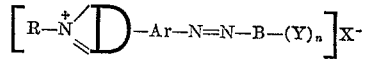

in which D is the residue of an azole ring system in which the quaternary nitrogen is the nitrogen of the azole ring, Ar is a carbocyclic ring system of less than three rings linked to the azole ring in the 2-position and to the azo bridge such that the said azo bridge is conjugated with the quaternized nitrogen, and B, Y, X, and R, and $n$ have the same definition as in claim 1.

17. Polyacrylonitrile fibers containing at least 50% of polyacrylonitrile dyed with 2-[p'-(2'',5''-dimethoxy-4''-aminophenylazo)-phenyl] - 3,6 - dimethylbenzthiazolium salts.

18. Polyacrylonitrile fibers containing at least 50% of polyacrylonitrile dyed with 2-[p'-(2'',5''-dimethoxy-4''-aminophenylazo)-phenyl]-1,3-dimethylimidazolium salts.

19. Polyacrylonitrile fibers containing at least 50% of polyacrylonitrile dyed with 2-[p'-aminonaphthylazophenyl]-1,3-dimethylbenzimidazolium salts.

References Cited in the file of this patent

UNITED STATES PATENTS

| | | |
|---|---|---|
| 1,671,257 | Rath | May 29, 1928 |
| 1,733,695 | Rath | Oct. 29, 1929 |
| 2,135,293 | Renshaw | Nov. 1, 1938 |
| 2,156,141 | Binz | Apr. 25, 1939 |
| 2,294,380 | Braker | Sept. 1, 1942 |
| 2,746,836 | Rossin | May 22, 1956 |
| 2,792,276 | Kaupin | May 14, 1957 |
| 2,815,338 | Ruegg | Dec. 3, 1957 |
| 2,864,812 | Bossard | Dec. 16, 1958 |
| 2,864,813 | Bossard | Dec. 16, 1958 |

OTHER REFERENCES

Venkataraman: Synthetic Dyes, Academic Press Inc., N.Y., 1952, p. 521.

Dorman: Amer. Dyestuff Reporter, July 5, 1954, p. 431.

UNITED STATES PATENT OFFICE
CERTIFICATE OF CORRECTION

July 7, 1959

Patent No. 2,893,816

Sien Moo Tsang et al.

It is hereby certified that error appears in the printed specification of the above numbered patent requiring correction and that the said Letters Patent should read as corrected below.

Column 17, line 6, for "R is an organic radical, $X^-$ is a non-aromatic anion, $R_1$" read -- R is a non-aromatic organic radical, $X^-$ is an anion, $R_1$ --.

Signed and sealed this 29th day of September 1959.

(SEAL)

Attest:

KARL H. AXLINE
Attesting Officer

ROBERT C. WATSON
Commissioner of Patents

UNITED STATES PATENT OFFICE

Certificate

Patent No. 2,893,816

Patented July 7, 1959

Sien Moo Tsang, Charles E. Lewis and Albert P. Paul

Application having been made jointly by Sien Moo Tsang, Charles E. Lewis and Albert P. Paul, the inventors named in the patent above identified, and American Cyanamid Company, New York, New York, a corporation of Maine, the assignee, for the issuance of a certificate under the provisions of Title 35, Section 256 of the United States Code, deleting the name of the said Albert P. Paul from the patent as a joint inventor, and a showing and proof of facts satisfying the requirements of the said section having been submitted, it is this 2nd day of April 1963, certified that the name of the said Albert P. Paul is hereby deleted from the said patent as a joint inventor with the said Sien Moo Tsang and Charles E. Lewis.

[SEAL]

EDWIN L. REYNOLDS,
*First Assistant Commissioner of Patents.*

Notice of Adverse Decision in Interference

In Interference No. 91,780 involving Patent No. 2,893,816, S. M. Tsang and C. E. Lewis, Polyacrylonitriles dyed with quaternized heterocyclic azo dyes, final judgment adverse to the patentees was rendered Nov. 29, 1962, as to claims 1, 2, 3, 4, 5 and 16.

[*Official Gazette October 27, 1964.*]